United States Patent [19]

Hirota et al.

[11] Patent Number: 5,760,112
[45] Date of Patent: Jun. 2, 1998

[54] WATER-BORNE AUTODEPOSITING COATING COMPOSITIONS

[75] Inventors: Mutsumi Hirota; Takumi Honda; Norifumi Hatano, all of Kanagawa-ken; Shoichi Sangenya; Shunjiro Saiki, both of Hyogo-ken, all of Japan

[73] Assignee: Henkel Corporation, Plymouth Meeting, Pa.

[21] Appl. No.: 696,958

[22] PCT Filed: Feb. 22, 1995

[86] PCT No.: PCT/US95/01935

§ 371 Date: Aug. 23, 1996

§ 102(e) Date: Aug. 23, 1996

[87] PCT Pub. No.: WO95/23038

PCT Pub. Date: Aug. 31, 1995

[30] Foreign Application Priority Data

Feb. 23, 1994 [JP] Japan .................. 6-049687

[51] Int. Cl.$^6$ .................................. C08K 5/42
[52] U.S. Cl. .................. 524/157; 524/158; 524/159; 524/160; 524/161; 524/162; 524/495; 524/496; 524/501
[58] Field of Search .................... 524/495, 496, 524/157, 158, 159, 160, 161, 162, 501

[56] References Cited

U.S. PATENT DOCUMENTS

| | | | |
|---|---|---|---|
| 3,709,743 | 1/1973 | Dalton et al. | 148/6.2 |
| 3,795,546 | 3/1974 | Hall et al. | 148/6.2 |
| 3,829,371 | 8/1974 | Miki et al. | 204/181 |
| 4,103,049 | 7/1978 | Nishida et al. | 427/341 |
| 4,177,180 | 12/1979 | Hall | 260/29.7 |
| 4,297,259 | 10/1981 | Papalos et al. | 260/29.6 NR |
| 4,411,937 | 10/1983 | Nishida et al. | 427/435 |
| 4,578,419 | 3/1986 | Hall | 514/401 |
| 4,874,673 | 10/1989 | Donovan et al. | 428/463 |

FOREIGN PATENT DOCUMENTS

| | | |
|---|---|---|
| 47-017630 | of 1972 | Japan . |
| 48-014412 | of 1973 | Japan . |
| 52-021006 | 6/1977 | Japan . |
| 52-035692 | 9/1977 | Japan . |
| 53-015093 | 5/1978 | Japan . |
| 53-016010 | 5/1978 | Japan . |

*Primary Examiner*—Edward J. Cain
*Attorney, Agent, or Firm*—Wayne C. Jaeschke; Norvell E. Wisdom, Jr.; Frank E. Robbins

[57] ABSTRACT

A water-borne autodepositing coating composition that has a pH of 1.6 to 5 and contains as essential components a water-dispersible or water-soluble organic coating-forming resin, a liquid dispersion of carbon black, acid, and oxidizing agent, and that may contain metal ions as an optional component, has an excellent storage stability and produces a strongly adherent and highly corrosion-resistant coating when the liquid dispersion of carbon black is an aqueous dispersion in which carbon black is dispersed using as a dispersant a naphthalenesulfonate-formaldehyde condensate.

16 Claims, No Drawings

WATER-BORNE AUTODEPOSITING COATING COMPOSITIONS

TECHNICAL FIELD

This invention relates to a water-borne autodepositing coating composition that has an excellent storage stability and that, when brought into contact with an electrochemically active metal surface, e.g., a surface of iron, zinc, iron alloy, or zinc alloy, efficiently coats the metal surface with a high-quality resin coating. This water-borne autodepositing coating composition is an acidic aqueous coating composition that contains water-dispersible or water-soluble organic coating-forming resin, pigment, acid, and oxidizing agent as essential components and may contain metal ions as an optional component.

BACKGROUND ART

Autodepositing coating compositions are acidic compositions containing organic coating-forming resin that are able to form a resin coating on the surface of an active metal brought into contact with the coating composition. Autodepositing coating compositions are disclosed, inter alia, in Japanese Patent Publication Numbers Sho 47-17630[17,630/1972], Sho 48-14412[14,412/1973], Sho 52-21006[21,006/1977], Sho 52-35692[35,692/1977], Sho 53-15093[15,093/1978], Sho 53-16010[16,010/1978], and Sho 53-44949 [44,949/1978] and Japanese Patent Application Laid Open [Kokai] Numbers Sho 60-58474[58,474/1985], Sho 61-168673[168,673/1986], and Sho 61-246267[246,267/1986].

When a clean active metal surface is immersed in an autodepositing coating composition, a resin coating is formed thereon in such a manner that the coating increases in thickness or weight with increasing immersion time. Coating formation by this type of composition is achieved through the chemical activity of the coating composition on the metal surface: Metal ions are eluted from the metal surface by etching, and these metal ions interact with the resin particles to cause their deposition on the metal surface. Thus, unlike electrodeposition processes, autodepositing coating compositions are able to efficiently form a resin coating on metal surfaces without the use of an external source of electricity.

When coloring is desired, pigment can be added to autodepositing coating compositions in order, for example, to increase the corrosion resistance or impart the desired tinctorial strength or degree of color. Japanese Patent Publication Numbers Sho 54-13453[13,453/1979] and Sho 59-275[275/1984] disclose management of the specific amount of pigment used based on the specific type of pigment used and the desired coating color. Japanese Patent Publication Number Sho 52-35692[35692/1977] discloses the formation of colored coatings by immersion of the substrate in autodepositing coating compositions containing various types of pigments.

With respect to the selection of pigment type, Japanese Patent Publication Number Sho 53-44949 teaches that there are no specific restrictions on type as long as the pigment is stable in the bath. Japanese Patent Application Laid Open Number Sho 60-58474 discloses a dispersant for maintaining the pigment particles in a dispersed state and teaches that the pigment dispersion should be selected in such a manner that the dispersant concentration in the aqueous phase of the autodepositing coating composition does not exceed the critical micelle concentration ("CMC").

U.S. Pat. No. 4,177,180 discloses autodepositing coating compositions in which the pigment particles are dispersed and stabilized by non-ionic dispersant and also discloses a method for the preparation of such compositions. However, U.S. Pat. No. 4,177,180 also states that a uniform coating appearance cannot be obtained when a colored coating is produced using pigment dispersed in the form of an autodepositing coating composition.

Otherwise, no examples are believed to have heretofore been reported with regard to the dispersion stability of pigmented autodepositing coating compositions as a function of the type of dispersant used to disperse and stabilize the pigment particles or with regard to the properties of coatings formed by substrate immersion in autodepositing coating compositions containing specific pigments.

DISCLOSURE OF THE INVENTION

Problems to Be Solved by the Invention

The invention takes as its object the introduction of a black pigment-containing autodepositing coating composition that is able to generate a black coating of uniform appearance, that exhibits a very good storage stability, and that forms a strongly adherent and highly corrosion-resistant coating.

Summary of the Invention

As a result of extensive investigations directed at solving the problems described above, the inventors discovered for the first time that very significant results are obtained by the use in otherwise conventional autodepositing coating compositions of a liquid dispersion of carbon black in which the carbon black is dispersed using a dispersant with a specific structure. The present invention was achieved based on this discovery.

In specific terms, the invention provides a water-borne autodepositing coating composition that has a pH of 1.6 to 5 and comprises, preferably consists essentially of, or still more preferably consists of: water, a water-dispersible or water-soluble organic coating-forming resin, a liquid dispersion of carbon black that was separately prepared and was mixed with other constituents of the autodeposition composition in the course of making the autodeposition composition, acid, and oxidizing agent, and, optionally, metal ions, wherein said liquid dispersion of carbon black, before it was mixed with all of the other ingredients of the autodepositing composition, comprised, preferably consisted essentially of, or more preferably consisted of, water, carbon black, and a dispersant that is a naphthalenesulfonate-formaldehyde condensate conforming to formula (I):

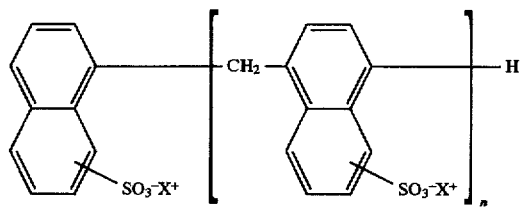

where X=Na, ½Ca, or NH₄ and n is an integer with a value of at least 1.

DESCRIPTION OF PREFERRED EMBODIMENTS

The most important characteristic feature of the invention is the use, as the liquid dispersion of carbon black incorporated into the water-borne autodepositing coating composition, of an aqueous carbon black dispersion in which the carbon black is dispersed in water using a naphthalenesulfonate-formaldehyde condensate conforming to formula (I).

No narrow restrictions obtain in the present invention on the quantity of dispersant used; however, an amount of 10 to 35 weight %, based on carbon black, is preferred from a consideration of dispersion stability (during accelerated stability testing). The degree of condensation of the naphthalenesulfonate acid-formaldehyde condensate in formula (I), which is indicated by the subscript n in formula (I), is preferably 10 to 30 based on dispersibility considerations. Finally, the naphthalenesulfonate-formaldehyde condensate preferably is used in the form of an ammonium salt (i.e., $X=NH_4$), based on an overall consideration of dispersion stability and coating performance.

The carbon black concentration in the liquid dispersion of carbon black is also not critical, but a 15 to 50% dispersion is preferred. The coating composition preferably contains 0.5 to 7.5 grams per liter (hereinafter usually abbreviated as "g/L") of carbon black and more preferably contains 1.0 to 1.5 g/L of carbon black.

The generally known channel blacks and furnace blacks may be used as the carbon black in the present invention.

The heretofore known autodepositing coating compositions are well suited for use as the autodepositing coating composition employed in the present invention, except for the change in the source of at least some of any carbon black previously used. In particular, no new restrictions apply to the organic coating-forming resins usable by the present invention, and those resins heretofore known for this purpose may be used for the present invention. Examples thereof are urethane resins, epoxy resins, polyester resins, and polymeric resins composed of one or more monomers selected from methyl acrylate, ethyl acrylate, n-butyl acrylate, 2-hydroxyethyl acrylate, 2-hydroxypropyl acrylate, 2-ethyl-hexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, acrylonitrile, styrene, ethylene, butadiene, vinyl chloride, vinylidene chloride, vinyl acetate, acrylic acid, methacrylic acid, and the like.

More specifically, Japanese Patent Application Laid Open Number Sho 60-58474 discloses coating compositions that contain dispersed vinylidene chloride-based copolymer, for example, copolymer composed of 50 to 70 weight % of vinylidene chloride; approximately 5 to 35 weight % of vinyl chloride; approximately 5 to 20 weight % of vinylic compound comprising at least 1 selection from acrylic acid, methacrylic acid, methyl acrylate, ethyl acrylate, butyl acrylate, ethyl methacrylate, acrylamide, methacrylamide, acrylonitrile, and methacrylonitrile; and approximately 0.1 to 5 weight % of sulfoethyl methacrylate. The preferred vinylidene chloride-based copolymer disclosed therein contains approximately 15 to 20 weight % of vinyl chloride, 2 to 5 weight % of butyl acrylate, 3 to 10 weight % of acrylonitrile, and approximately 1 to 2 weight % of sulfoethyl methacrylate (for example, Daran™ latices from W. R. Grace & Company, Serfene™ latices from Morton Chemical, and Haloflex™ 202 from Imperial Chemical Industries).

The resin concentration in the water-borne autodepositing coating composition of the present invention is preferably 5 to 550 g/L and more preferably 50 to 100 g/L. The coating composition according to the invention should have a pH of 1.6 to 5.0: A high-quality coating will not usually be formed when compositions with a pH outside this range are used.

In addition to the resin component as described above, the heretofore known water-borne autodepositing coating compositions usable by the present invention also contain acid and oxidizing agent as essential components, and may contain metal ions as an optional component. One example of applicable water-borne autodepositing coating compositions is the water-borne autodepositing coating composition, disclosed in Japanese Patent Application Laid Open Number Sho 49-108135[108,135/1974], of dispersed resin at approximately 5 to 550 g/L as solids concentration; any suitable acid that can supply hydrogen ions to the composition, but preferably approximately 0.4 to 5.0 g/L of hydrofluoric acid; oxidizing agent, whose type is not critical, but which is preferably hydrogen peroxide at not more than approximately 3.0 g/L; and metal compound capable of furnishing metal ions, for example, approximately 1 to 50 g/L in the case of ferric fluoride. Another example is the coating composition disclosed in Japanese Patent Publication Number Sho 53-44949, which contains dispersed resin at approximately 5 to 550 g/L as solids concentration, approximately 0.4 to 5.0 g/L of hydrofluoric acid as acid, not more than approximately 3.0 g/L of hydrogen peroxide as oxidizing agent, and a metal compound, for example, approximately 0.1 to 10.0 g/L in the case of silver fluoride.

The invention is explained in greater detail below with reference to working and comparison examples.

EXAMPLES AND COMPARISON EXAMPLES

Various water-borne autodepositing coating compositions were prepared using the recipe given below and were subjected to coating performance testing.

| Recipe for the water-borne autodepositing coating compositions | |
|---|---|
| Ingredient | Quantity |
| Daran ™ SL-143 latex[1] (55% solids) | 90.90 g/L |
| Carbon black dispersion[2] | 5.60 g/L |
| Hydrofluoric acid | 0.70 g/L |
| Hydrogen peroxide | 0.10 g/L |
| and deionized water sufficient to make a total 1 L. | |

[1]From W. R. Grace & Co.; the organic coating-forming resin is a vinylidene chloride-based resin).
[2]The carbon black dispersion contained dispersant as reported in Table 1 in the quantity noted in Table 1; the carbon black, a furnace black, was adjusted to a concentration of 25 weight % in the dispersion.

The various test methods are explained below.

Dispersion stability

The compatibility and accelerated stability (condition after 7 days at 40° C.) were evaluated for each autodepositing coating composition prepared for the examples and comparison examples, except that for those of the comparison examples for which the compatibility was unsatisfactory, the accelerated stability was not measured.

The compatibility was evaluated using the following scale:
 ++: excellent dispersion
 x: poor dispersion (production of aggregates or viscosity increase during preparation of the dispersion)

The accelerated stability was evaluated using the following scale.
 ++: no change in appearance or viscosity
 +: increase in viscosity
 x: precipitation or separation of solids or production of aggregates The results of these evaluations are reported in Table 1.

Coating performance

Preliminarily cleaned cold-rolled steel panels (70×150×1 mm) were coated by immersion for 180 seconds in the respective baths of the water-borne autodepositing coating compositions described above. The baths were maintained at approximately 20° C. to 22° C. After then rinsing with water, the panels were dried in an oven at 110° C. for 20 minutes and were thereafter subjected to evaluation testing. The thickness of the coating on each test panel was approximately 20 microns for all the examples and for the comparison example with lignosulfate dispersant, the only comparison example which had a satisfactory coating performance.

(1) Coating adherence (crosscut/tape peel test)

A crosshatch pattern of one hundred 1 mm×1 mm squares was cut in the test panel and peeled with adhesive tape, and the number of remaining coating squares was counted. This test was conducted both before and after immersion in water at 40° C. for 240 hours. The values reported under "a" in Table 1 refer to the pre-immersion test, and the values reported under "b" refer to the post-immersion test.

(2) Corrosion Resistance

A cross cut was scribed through the paint film to the base metal, followed by salt-spray testing according to Japanese Industrial Standard Z-2371 for 500 hours. This was followed by tape peeling. Evaluation consisted of measuring the width of peel from the scribed cross (maximum on one side in mm).

The results of the performance testing on the test panels are reported in Table 1.

The following conclusions can be drawn based on the results reported for the examples and comparison examples:

1. Naphthalenesulfonate-formaldehyde condensates with formula (I) in accordance with the present invention were used as the carbon black dispersant in all examples according to the invention. In each case, the dispersion stability was excellent and the coating obtained had an excellent adherence and an excellent corrosion resistance.

2. The first comparison example listed in Table 1 employed lignosulfate, which does not conform to formula (I) as is required for this invention. In this case, the coating performance was excellent, but the dispersion stability was poor.

TABLE 1

| | Carbon Black Dispersion | | | Dispersion Stability | | Coating Performance | | |
|---|---|---|---|---|---|---|---|---|
| Dispersant | Degree of Condensation[1] | Amt. of Dis. as % of C.B. | pH of Coating Comp. | Compatibility | Accelerated Stability | Adherence "a" | Adherence "b" | Corrosion Resistance |
| *Examples According to the Invention* | | | | | | | | |
| NH₄ NFC | 5 | 20 | 3.2 | ++ | + | 100 | 100 | 1.0 |
| | 10 | 20 | 3.3 | ++ | ++ | 100 | 100 | 1.5 |
| | 15 | 5 | 3.4 | ++ | + | 100 | 100 | 1.0 |
| | | 20 | 3.3 | ++ | ++ | 100 | 100 | 0.5 |
| | | 40 | 3.5 | ++ | ++ | 100 | 98 | 1.0 |
| | 20 | 5 | 3.6 | ++ | ++ | 100 | 100 | 2.0 |
| | | 20 | 3.2 | ++ | ++ | 100 | 100 | 0.5 |
| | | 40 | 3.0 | ++ | ++ | 100 | 98 | 1.0 |
| | 30 | 20 | 3.3 | ++ | ++ | 100 | 100 | 0.5 |
| | 35 | 20 | 3.0 | ++ | ++ | 100 | 98 | 1.5 |
| | | 40 | 3.0 | ++ | ++ | 100 | 85 | 2.5 |
| Na NFC | 10 | 20 | 3.1 | ++ | + | 100 | 100 | 1.5 |
| | 30 | 20 | 2.9 | ++ | + | 100 | 100 | 1.5 |
| Ca NFC | 30 | 20 | 3.0 | ++ | + | 100 | 100 | 2.0 |
| *Comparison Examples* | | | | | | | | |
| Lignosulfate | 10 | | 3.5 | ++ | x | 100 | 100 | 1.0 |
| AP-EO Adduct | 10 | | 3.3 | ++ | ++ | no coating formed | | |
| Imid. Laurate | 10 | | 3.2 | ++ | ++ | no coating formed | | |
| POE Lauryl Ether[2] | 15 | | ³ | x | ³ | no coating attempted | | |
| POE Oleyl Ether[4] | 15 | | ³ | x | ³ | no coating attempted | | |
| Styr. POE Ether | 15 | | ³ | x | ³ | no coating attempted | | |
| None | — | | ³ | x | ³ | no coating attempted | | |

Footnotes for Table 1

[1]This column applies only to the examples according to the invention, and the space that would otherwise be used if this column were continued is added to the space for describing the dispersant for the comparison examples.
[2]This dispersant had a hydrophile-lipophile balance value of 16.
[3]The dispersion was so unstable that this measurement was not made for it.
[4]This dispersant had a hydrophile-lipophile balance value of 14.

Explanation of Abbreviations in Table 1

"Comp." means "Composition"; "Amt." means "Amount"; "Dis." means "Dispersant"; "C.B." means "Carbon Black"; "NFC" means naphthalene-formaldehyde condensate; "AP-EO" means "alkyl phenol-ethylene oxide adduct"; "Imid." means "imidazoline"; "POE" means "polyoxyethylene"; and "Styr." means "styrenated".

3. The next two comparison examples listed in Table 1 employed as dispersants an alkylphenol-ethylene oxide adduct and imidazoline laurate respectively; neither of these conforms to formula (I). In these cases, the dispersion stability was excellent, but coating deposition was poor.

4. In all of the remaining comparison examples, which used polyoxyethylene-type dispersants, which do not conform to formula (I), or no dispersant, the dispersion stability was so poor that no autodeposition was even attempted in all these cases.

Benefits of the Invention

The solids in the water-borne autodepositing coating composition of the invention do not precipitate, separate, or aggregate during storage. Moreover, when the water-borne autodepositing coating composition of the invention is brought into contact with an active metal surface, for example, the surface of a ferrous, zinciferous, aluminiferous, or magnesium-containing metal, it forms on said metal surface a black resin coating that is strongly adherent, highly corrosion resistant, and uniform in appearance.

The invention claimed is:

1. A water-borne autodepositing coating composition that has a pH of 1.6 to 5 and comprises: water, a water-dispersible or water-soluble organic coating-forming resin, a liquid dispersion of carbon black that was separately prepared and mixed with the other ingredients of the autodeposition composition in the course of making the autodeposition composition, acid, and oxidizing agent, wherein said liquid dispersion of carbon black, before it was mixed with all of the other ingredients of the autodepositing composition, comprised: water, carbon black, and a dispersant that is a naphthalenesulfonate-formaldehyde condensate conforming to formula (I):

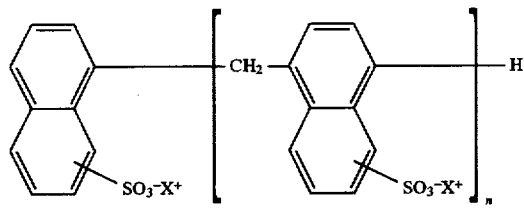

where X represents Na, ½Ca, or $NH_4$ and n represents an integer with a value of at least 1.

2. A water-borne autodepositing coating composition according to claim 1, wherein the liquid dispersion of carbon black contains an amount of dispersant conforming to formula (I) that is from 10 to 35 weight % of the amount of carbon black in the dispersion.

3. A water-borne autodepositing coating composition according to claim 2, wherein the naphthalenesulfonate-formaldehyde condensate dispersant has a value of n in formula (I) in the range from 10 to 30.

4. A water-borne autodepositing coating composition according to claim 3, wherein X in formula (I) to which the dispersant conforms is $NH_4$.

5. A water-borne autodepositing coating composition according to claim 1, wherein the naphthalenesulfonate-formaldehyde condensate dispersant has a value of n in formula (I) in the range from 10 to 30.

6. A water-borne autodepositing coating composition according to claim 5, wherein X in formula (I) to which the dispersant conforms is $NH_4$.

7. A water-borne autodepositing coating composition according to claim 2, wherein X in formula (I) to which the dispersant conforms is $NH_4$.

8. A water-borne autodepositing coating composition according to claim 1, wherein X in formula (I) to which the dispersant conforms is $NH_4$.

9. A process of forming an autodeposited coating on a metal substrate, comprising contacting the metal substrate with a water-borne autodepositing coating composition according to claim 8.

10. A process of forming an autodeposited coating on a metal substrate, comprising contacting the metal substrate with a water-borne autodepositing coating composition according to claim 7.

11. A process of forming an autodeposited coating on a metal substrate, comprising contacting the metal substrate with a water-borne autodepositing coating composition according to claim 6.

12. A process of forming an autodeposited coating on a metal substrate, comprising contacting the metal substrate with a water-borne autodepositing coating composition according to claim 5.

13. A process of forming an autodeposited coating on a metal substrate, comprising contacting the metal substrate with a water-borne autodepositing coating composition according to claim 4.

14. A process of forming an autodeposited coating on a metal substrate, comprising contacting the metal substrate with a water-borne autodepositing coating composition according to claim 3.

15. A process of forming an autodeposited coating on a metal substrate, comprising contacting the metal substrate with a water-borne autodepositing coating composition according to claim 2.

16. A process of forming an autodeposited coating on a metal substrate, comprising contacting the metal substrate with a water-borne autodepositing coating composition according to claim 1.

* * * * *